US012623732B2

(12) United States Patent　　　(10) Patent No.:　US 12,623,732 B2

Favaretto　　　　　　　　　　　　(45) Date of Patent:　　May 12, 2026

(54) AERODYNAMIC BOTTOM OF A CAR

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 382 days.

(21) Appl. No.: 18/462,931

(22) Filed: Sep. 7, 2023

(65) Prior Publication Data

US 2024/0083521 A1　　Mar. 14, 2024

(30) Foreign Application Priority Data

Sep. 12, 2022　(IT) ........................ 102022000018489

(51) Int. Cl.
B62D 35/00　　　(2006.01)
B62D 35/02　　　(2006.01)

(52) U.S. Cl.
CPC ................................. B62D 35/007 (2013.01)

(58) Field of Classification Search
CPC .............................. B62D 35/02; B62D 35/007
See application file for complete search history.

(56) References Cited

U.S. PATENT DOCUMENTS

| | | | |
|---|---|---|---|
| 2017/0190364 A1* | 7/2017 | Fahland | B62D 37/02 |
| 2017/0297637 A1* | 10/2017 | Shinedling | B62D 37/02 |
| 2019/0009841 A1* | 1/2019 | Wolf | B62D 35/007 |
| 2019/0337577 A1* | 11/2019 | Del Gaizo | B62D 35/007 |
| 2021/0403102 A1* | 12/2021 | Beierl | B62D 35/02 |
| 2022/0355872 A1* | 11/2022 | Beierl | B62D 37/02 |
| 2023/0094537 A1* | 3/2023 | Ando | B62D 35/02 |
| | | | 296/181.5 |
| 2025/0115311 A1* | 4/2025 | Green | B62D 35/02 |

FOREIGN PATENT DOCUMENTS

| | | |
|---|---|---|
| DE | 102019112925 A1 | 11/2020 |
| DE | 102021111749 B3 | 4/2022 |

OTHER PUBLICATIONS

Italian Search Report for Application No. 102022000018489, Filing Date: Sep. 12, 2022; Date of Mailing: Apr. 23, 2023, 7 pages.

* cited by examiner

*Primary Examiner* — Patricia L Engle

(74) *Attorney, Agent, or Firm* — CANTOR COLBURN LLP

(57)　　　　　　ABSTRACT

A car has a support frame defining part of a lower floor of the car, a passenger compartment projecting upwards from the lower floor, a driving engine to move the car, and an aerodynamic bottom, which is at least partly fixed to the support frame, defines part of the lower floor and is provided with a rear bottom, which is mounted in a rear area of the car and has a tilting portion mounted so as to move between at least two operating positions having different inclinations relative to a road surface.

8 Claims, 5 Drawing Sheets

AERODYNAMIC BOTTOM OF A CAR

CROSS-REFERENCE TO RELATED APPLICATIONS

This patent application claims priority from Italian patent application no. 102022000018489 filed on Sep. 12, 2022, the entire disclosure of which is incorporated herein by reference.

TECHNICAL FIELD

The invention relates to a car.

In particular, the invention relates to a car of the kind comprising a support frame defining part of a lower floor of the car; a passenger compartment mounted on the support frame and projecting upwards from the lower floor; a driving engine to move the car; and an aerodynamic bottom fixed to the support frame and defining part of the lower floor.

BACKGROUND

The aerodynamic bottom comprises a front bottom, which is mounted in a front area of the car, a rear bottom, which is mounted in a rear area of the car, and a central bottom, which is mounted in a central area of the car.

The consumption of liquid or gaseous fuels or of electrical power during the normal operation of the car depends on the vertical aerodynamic load acting upon the car.

The vertical aerodynamic load acting upon the car depends, in turn, on the deflection undergone by the air flowing under the lower floor from the front area to the rear area of the car.

To this regard, it should be pointed out that the vertical aerodynamic load acting upon the car and, therefore, the consumption of liquid or gaseous fuels or of electrical power increase when there is an increase in the deflection undergone by the air flowing under the lower floor from the front area to the rear area of the car and decrease when there is a decrease in the deflection undergone by the air flowing under the lower floor from the front area to the rear area of the car.

Known cars of the kind described above suffer from some drawbacks, which are mainly due to the fact that the position of the lower floor and of the aerodynamic bottom is incapable of ensuring a correct vertical aerodynamic load acting upon the car during its normal operation based on the driving conditions and on the conditions of the road surface and, hence, is incapable of ensuring a correct consumption of liquid or gaseous fuels or of electrical power.

SUMMARY

The object of the present invention is to provide a car designed to eliminate the aforementioned drawbacks in a straightforward, relatively low-cost manner.

According to the invention, there is provided a car as claimed in the appended claims.

BRIEF DESCRIPTION OF THE DRAWINGS

The invention will now be described with reference to the accompanying drawings showing a non-limiting embodiment thereof, wherein.

DESCRIPTION OF EMBODIMENTS

Figure 1:
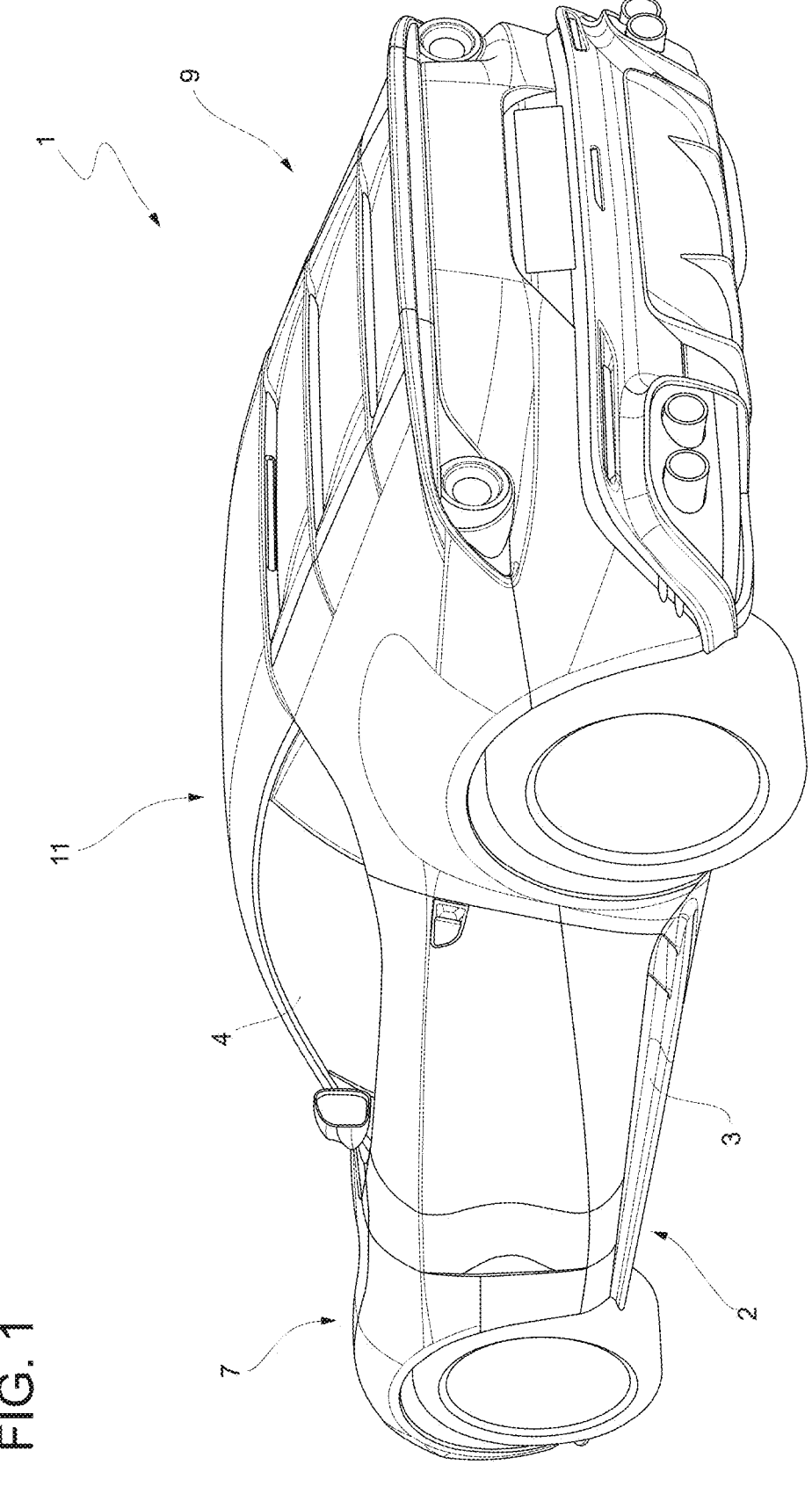
FIG. 1 is a schematic perspective view, with parts removed for greater clarity, of a preferred embodiment of the car according to the invention.
Figure 2:
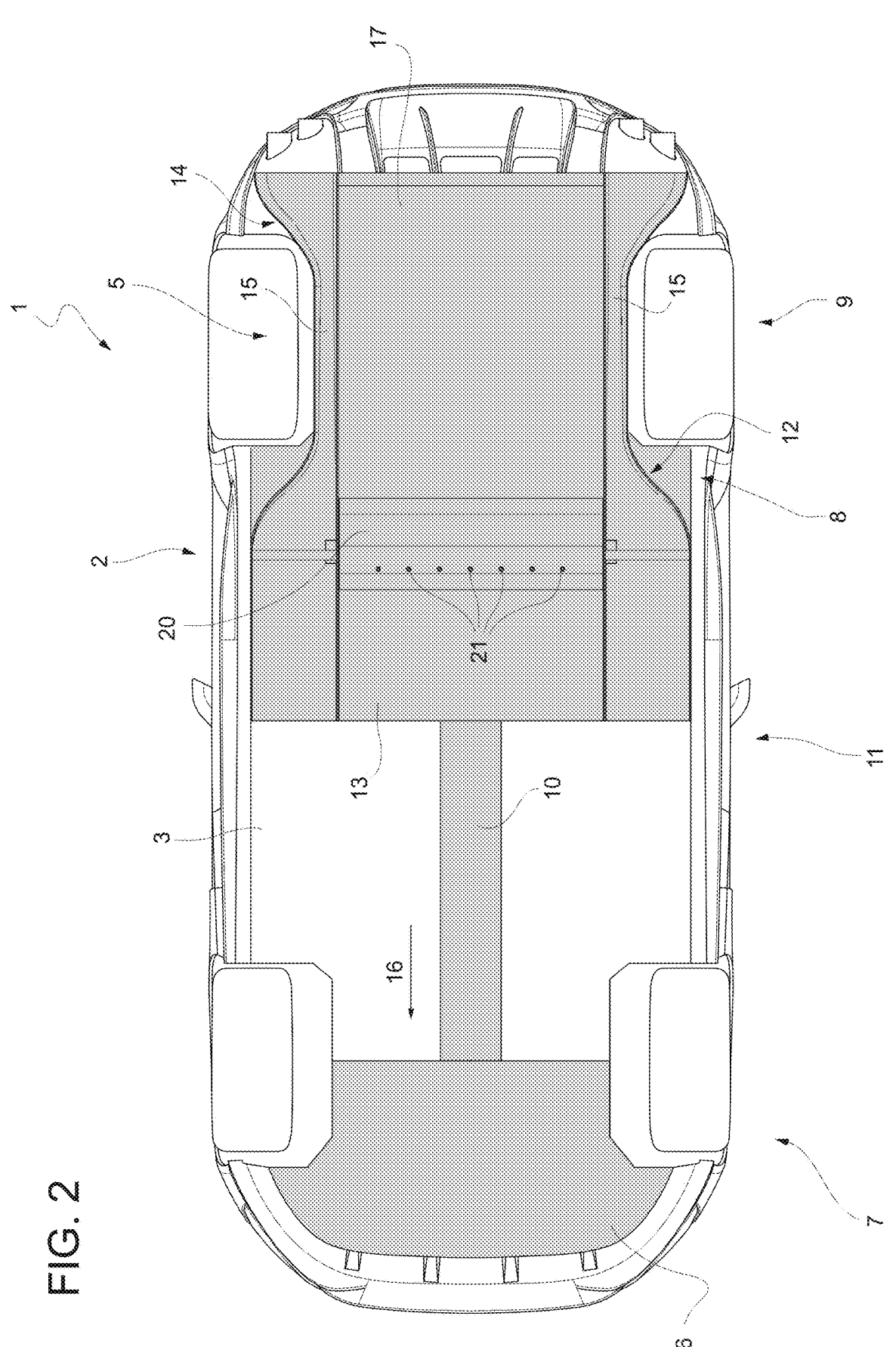
FIG. 2 is a schematic bottom view, with parts removed for greater clarity, of the car of FIG. 1.

With reference to FIGS. 1 and 2, number 1 indicates, as a whole, a car, in particular a sports car, comprising a support frame 2 defining part of a lower floor 3 of the car 1.

The car 1 further comprises a passenger compartment 4, which is mounted on the frame 2 and projects upwards from the floor 3, and an aerodynamic bottom 5, which is partly fixed to the frame 2 and defines part of the floor 3.

The bottom 5 comprises a front bottom 6, which is fixed to the frame 2 in a front area 7 of the car 1, a rear bottom 8, which is mounted in a rear area 9 of the car 1, and an elongated central bottom 10, which is fixed to the frame 2 between the bottoms 6 and 8 and in a central area 11 of the car 1.

The car 1 further comprises a known driving engine, which is not shown herein, is mounted, in this specific case, at the centre of the rear area 9 and is connected to the frame 2 through the interposition of a known elastic shock absorber device, which is not shown herein, so as to have at least one degree of freedom relative to the frame 2 during the normal operation of the car 1.

According to FIGS. 3 to 6, the rear bottom 8 comprises a fixed portion 12, which is fixed to the frame 2 and comprises, in turn, a plate 13 with a rectangular shape facing the central bottom 10 and a frame 14 with an annular shape mounted on the side opposite the central bottom 10 relative to the plate 13.

The frame 14 is configured so as to define two air feeding channels 15, which are parallel to one another and to a travel direction 16 of the car 1.

The rear bottom 8 further comprises a movable portion 17, which has a rectangular shape, is mounted within the frame 14 and extends between the channels 15.

Figure 3:
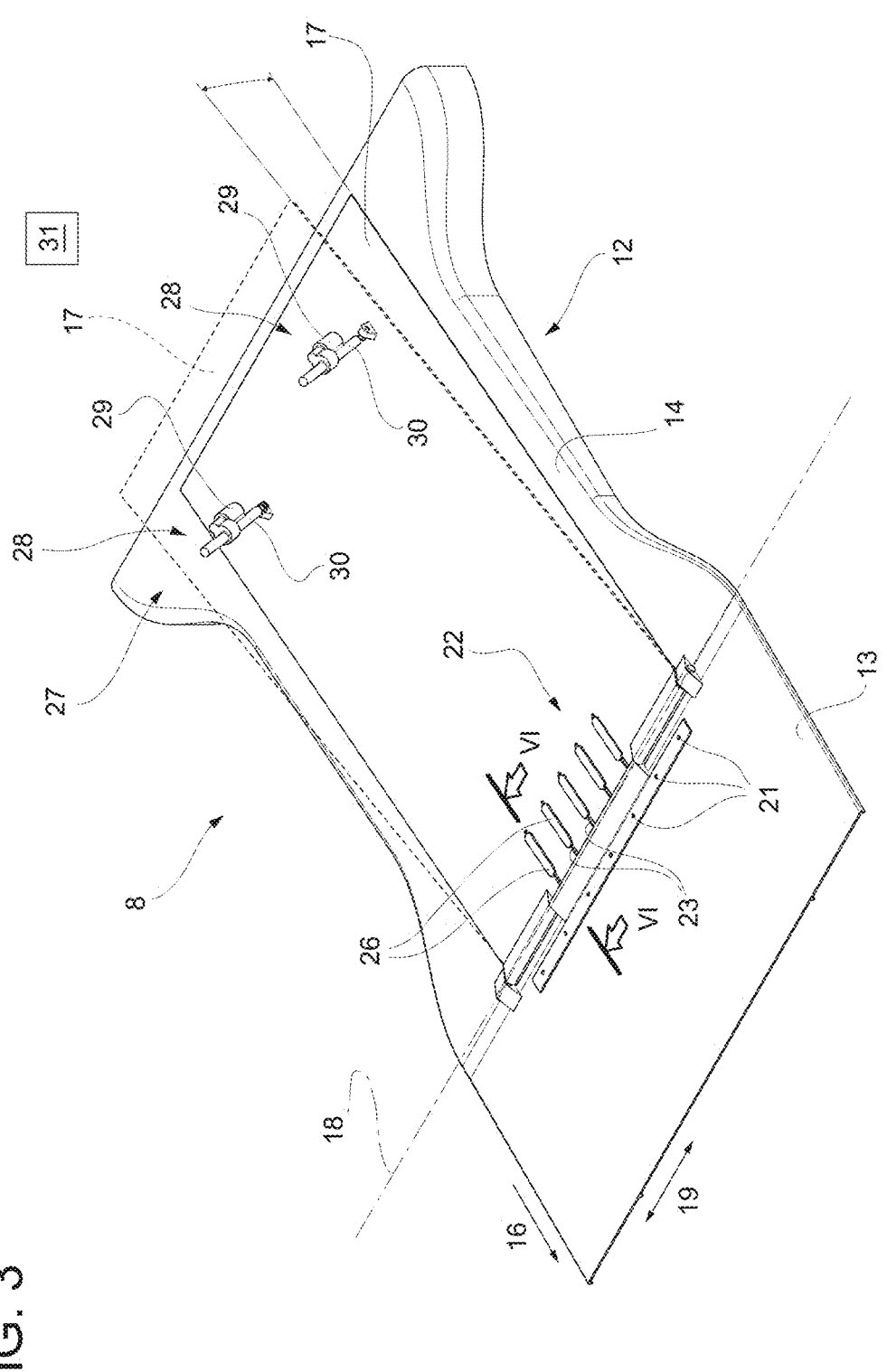
FIG. 3 is a first schematic perspective view, with parts removed for greater clarity, of a detail of the car of FIG. 1.
Figure 4:
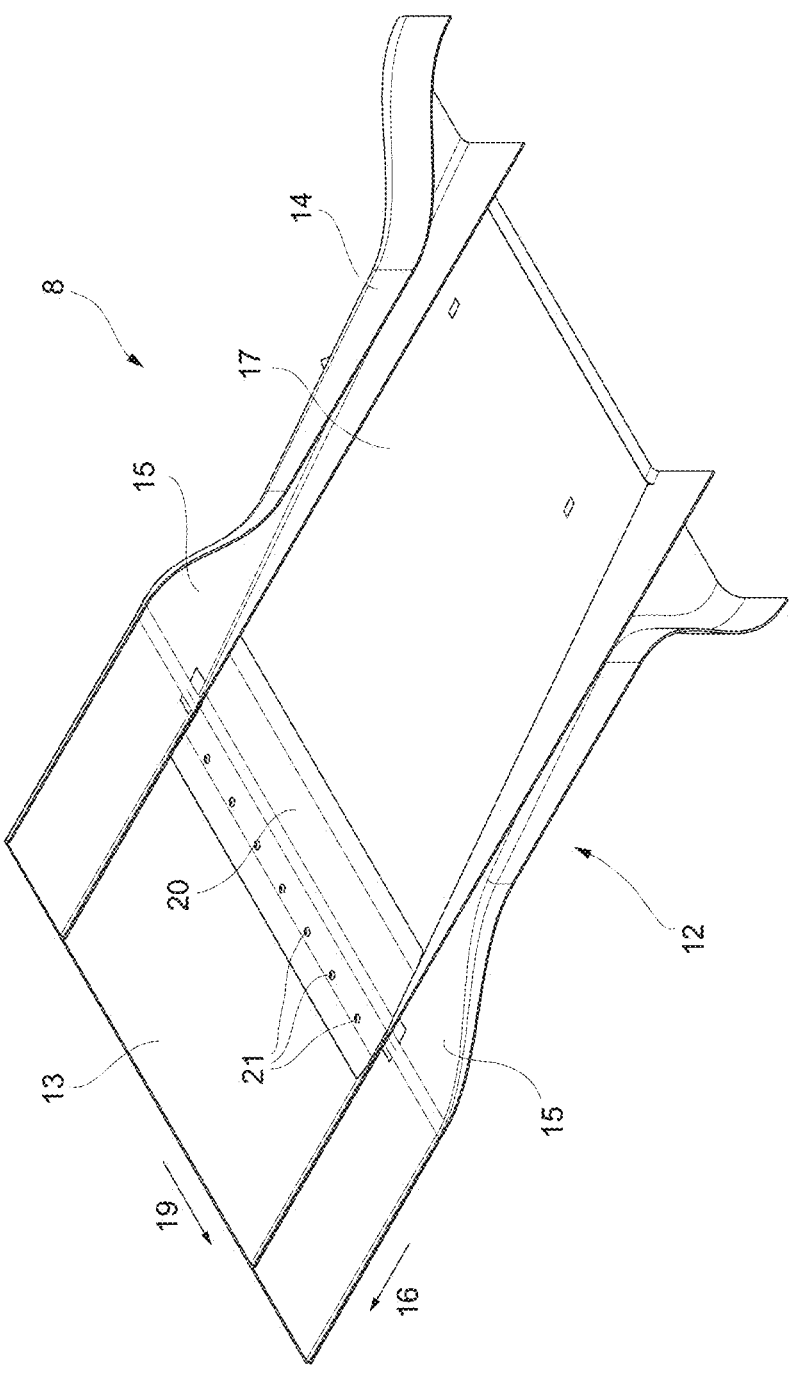
FIG. 4 is a second schematic perspective view, with parts removed for greater clarity, of the detail of FIG. 3.
Figure 5:
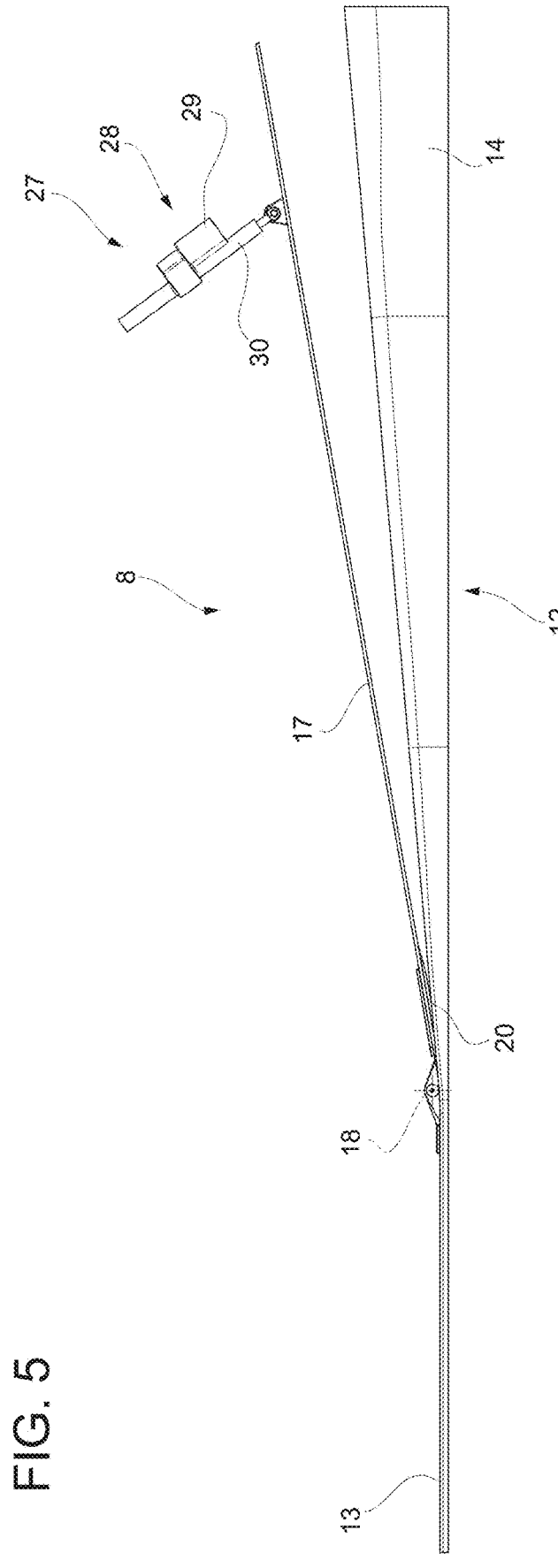
FIG. 5 is a schematic side view, with parts removed for greater clarity, of the detail of FIG. 3.
Figure 6:
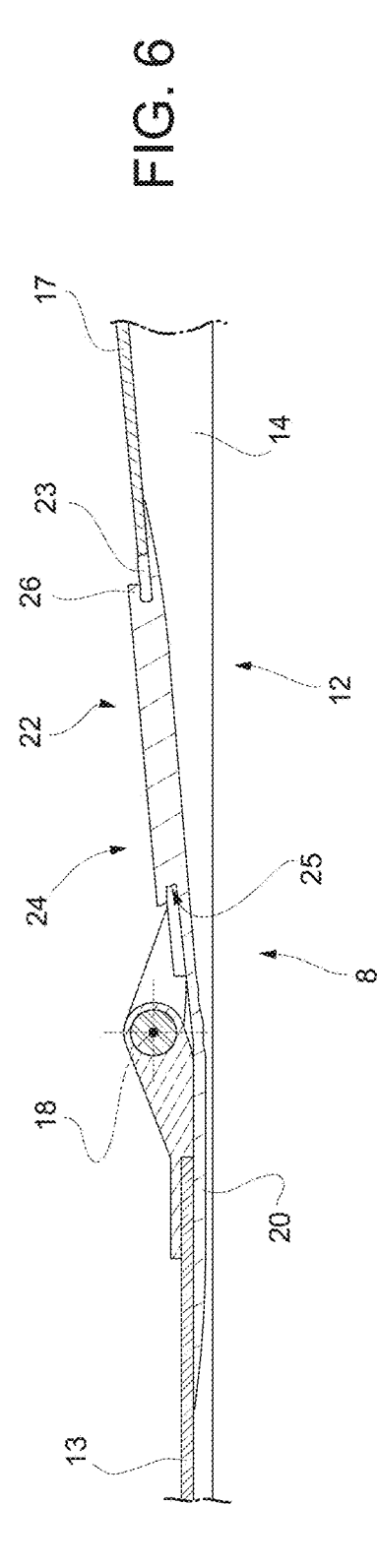
FIG. 6 is a schematic side view, with parts in section and with parts removed for greater clarity, of the detail of FIG. 3.

The portion 17 is hinged to the portion 12 so as to rotate, relative to the portion 12 and, hence, relative to the car frame 2, around a fulcrum axis 18, which is parallel to a direction 19 transverse to the direction 16, between a lowered position, in which the portion 17 is substantially coplanar to the frame 14, and a lifted position (FIGS. 3 and 5).

The rear bottom 8 further comprises a covering layer 20, which is, preferably though not necessarily, made of an elastically deformable material, is mounted under the bottom 8, is fixed to the fixed portion 12 by means of a plurality of fastening screws 21 distributed in the direction 19 and extends on the axis 18 and on at least part of the portion 17.

The portion 17 and the layer 20 are connected to one another by means of a coupling device 22 comprising a plurality of slots 23, which are obtained through the portion 17, are parallel to one another and to the direction 16 and are aligned with one another in the direction 19.

The device 22 further comprises, for each slot 23, a respective tooth 24, which projects upwards from the layer 20 and has a stem 25, which is engaged in the slot 23 in a sliding manner, and a head 26, which is obtained on the side opposite the layer 20 relative to the slot 23 so as to lock the layer 20 on the portion 17 perpendicularly to the portion 17 itself.

Following the rotation of the portion 17 around the axis 18, the layer 20 is moved by the portion 17 around the axis 18 so as to allow the teeth 24 to slide inside the relative slots 23.

The layer 20 ensures the continuity and the aerodynamic character of the rear bottom 8 in any position of the portion 17 around the axis 18.

The portion 17 is continuously moved around the axis 18 by an operating device 27 comprising, in this specific case, two electrically operated actuator cylinders 28.

Each cylinder 28 comprises an electric motor 29, which is coupled to the frame 2 and has an output rod 30 coupled to the portion 17.

The car 1 further comprises an electronic control unit 31 configured to selectively control the operation of the operating device 27 and of the actuator cylinders 28 and, hence, the inclination of the portion 17 relative to the road surface depending on an operating parameter, for example the speed, of the car 1 and/or on a geometric parameter of a forward moving path (not shown) of the car 1.

The lifting of the portion 17 around the axis 18 leads to an increase in the deflection undergone by the air flowing under the lower floor 3 from the front area 7 to the rear area 9 and, hence, in the vertical aerodynamic load acting upon the car 1.

The lowering of the portion 17 around the axis 18 leads to a decrease in the deflection undergone by the air flowing under the lower floor 3 from the front area 7 to the rear area 9 and, hence, in the vertical aerodynamic load acting upon the car 1.

The car 1 has several advantages, which are mainly due to the fact that the assembly defined by the portion 17, by the operating cylinders 28 and by the electronic control unit 31 allows to selectively control the position of the portion 17 around the axis 18 and the aerodynamic load acting upon the car 1, thus optimizing the consumption of liquid or gaseous fuels or of electrical power of the car 1.

The invention claimed is:

1. A car comprising:
   a support frame (2) defining part of a lower floor (3) of the car;
   a passenger compartment (4) projecting upwards from the lower floor (3);
   a driving engine to move the car; and
   an aerodynamic bottom (5), which is at least partly fixed to the support frame (2), defines part of the lower floor (3) and comprises a rear bottom (8) mounted in a rear area (9) of the car; and characterized in that the rear bottom (8) comprises a tilting portion (17) mounted so as to move between at least two operating positions having different inclinations relative to a road surface;
   wherein the rear bottom (8) further comprises a fixed portion (12) fixed to the support frame (2), the tilting portion (17) being hinged to the fixed portion (12) so as to rotate around a fulcrum axis (18) between said operating positions;
   the car further comprising a covering layer (20), which is fixed to the support frame (2) or to the fixed portion (12) under the lower floor (3) and extends on the fulcrum axis (18) and on at least part of the tilting portion (17);
   wherein the tilting portion (17) is mounted so as to rotate around a fulcrum axis (18) between said operating positions.

2. The car according to claim 1, wherein the covering layer (20) is coupled to the tilting portion (17) so as to rotate, together with the tilting portion (17), around the fulcrum axis (18).

3. The car according to claim 2, wherein the tilting portion (17) has a plurality of slots (23), which extend in a first direction (16) parallel to the tilting portion (17) and are aligned with one another in a second direction (19) parallel to the fulcrum axis (18) and transverse to the first direction (16).

4. The car according to claim 3, wherein the covering layer (20) has a plurality of teeth (24), which are as many as the slots (23) and each extend through a respective slot (23).

5. The car according to claim 4, wherein each tooth (24) comprises a stem (25) engaged in the relative slot (23) in a sliding manner and a head (26) arranged on the opposite side of the covering layer (20) relative to the relative slot (23) so as to lock the tooth (24) on the tilting portion (17).

6. The car according to claim 1 and further comprising an operating device (27) configured to continuously move the tilting portion (17) of the rear bottom (8) between a lowered end position and a lifted end position.

7. The car according to claim 6 and further comprising an electronic control unit (31) configured to selectively control the operation of the operating device (27) and, hence, the inclination of the tilting portion (17) of the rear bottom (8) depending on an operating parameter of the car and/or on a geometric parameter of a forward moving path of the car.

8. The car according to claim 1, wherein the rear bottom (8) further comprises two air feeding channels (15) arranged on opposite sides of the tilting portion (17).

\* \* \* \* \*